United States Patent [19]

Gray, Jr.

[11] 4,234,949
[45] Nov. 18, 1980

[54] MULTIPLEXER AND TIME DURATION MEASURING CIRCUIT

[75] Inventor: James Gray, Jr., Downers Grove, Ill.
[73] Assignee: The United States of America as represented by the United States Department of Energy, Washington, D.C.
[21] Appl. No.: 28,741
[22] Filed: Apr. 10, 1979
[51] Int. Cl.³ .............................................. H04L 5/00
[52] U.S. Cl. ................................ 370/41; 340/147 LP
[58] Field of Search ........... 179/15 BL, 15 A, 15 BA, 179/2 AM; 340/147 LP, 206; 178/50; 328/112; 370/41, 42, 112

[56] References Cited

U.S. PATENT DOCUMENTS

| | | | |
|---|---|---|---|
| 3,485,953 | 12/1969 | Norberg | 178/50 |
| 3,979,732 | 9/1976 | Hepworth et al. | 340/147 LP |
| 4,122,311 | 10/1978 | Klatt et al. | 178/50 |
| 4,146,750 | 3/1979 | Spiesman | 179/15 A |

OTHER PUBLICATIONS

"Temporal-Priority Circuit Latches after Receipt of First Input Signal", Hicks, Electronic Design, No. 23, Nov. 8, 1973.

Primary Examiner—Thomas A. Robinson
Attorney, Agent, or Firm—James E. Denny; Paul A. Gottlieb; Richard G. Besha

[57] ABSTRACT

A multiplexer device is provided for multiplexing data in the form of randomly developed, variable width pulses from a plurality of pulse sources to a master storage. The device includes a first multiplexer unit which includes a plurality of input circuits each coupled to one of the pulse sources, with all input circuits being disabled when one input circuit receives an input pulse so that only one input pulse is multiplexed by the multiplexer unit at any one time.

8 Claims, 3 Drawing Figures

MULTIPLEXER AND TIME DURATION MEASURING CIRCUIT

CONTRACTUAL ORIGIN OF THE INVENTION

The invention described herein was made in the course of, or under, a contract with the UNITED STATES DEPARTMENT OF ENERGY.

BACKGROUND OF THE INVENTION

A multiplexer is a device for transferring data from a plurality of inputs to a single storage facility. Many radiation monitors utilize scintillation counters, ionization chambers, proportional counters and photomultipliers. They are detectors which randomly generate pulses whose output amplitudes are converted to constant voltage pulses whose width is exactly proportional to the amplitude of the input pulse. These width modulated pulses' time duration must be measured and stored together with an indication of the particular detector which was the source of the pulse. Prior art devices for doing this require an intermediate buffering for each detector of a monitor system to insure that simultaneous events are not lost. Since the pulses from the detectors occur randomly and over large periods of time, economy of apparatus, i.e. only one master storage, can be achieved if a multiplexing scheme can be provided to transfer data from the detectors to the buffer in such a manner that data is not lost if simultaneous scintillation events occur. To achieve the limited apparatus utilizing only one master buffer, the multiplexer or intermediate buffer desirably has a fast fixed time delay and ideally would have minimum data loss and minimum hardware requirements.

It is therefore an object of this invention to provide an improved multiplexer.

Another object of this invention is to provide an improved multiplexer for transferring data in the form of pulse duration and pulse source from a plurality of detectors to a master buffer.

SUMMARY OF THE INVENTION

A multiplexer and pulse time duration measurement circuit is provided for transferring data from a plurality of sources of pulses of varying width to a master storage. The circuit includes at least one multiplexer unit which includes a plurality of D type flip-flops each being coupled to one of the sources. The flip-flops are part of circuitry which disables the other flip-flops of the unit when one flip-flop receives a source pulse and which reproduces and stores the width of the source pulse. A plurality of units may be utilized so that even with a source pulse being received another unit is available to receive another source pulse.

DETAILED DESCRIPTIONS OF THE DRAWING

FIG. 1 is a block diagram of a multiplexing system;
FIG. 2 is a schematic of a multiplexer; and
FIG. 3 is a time diagram showing the various responses of some of the elements of the multiplexer.

DETAILED DESCRIPTION

Figure 1:
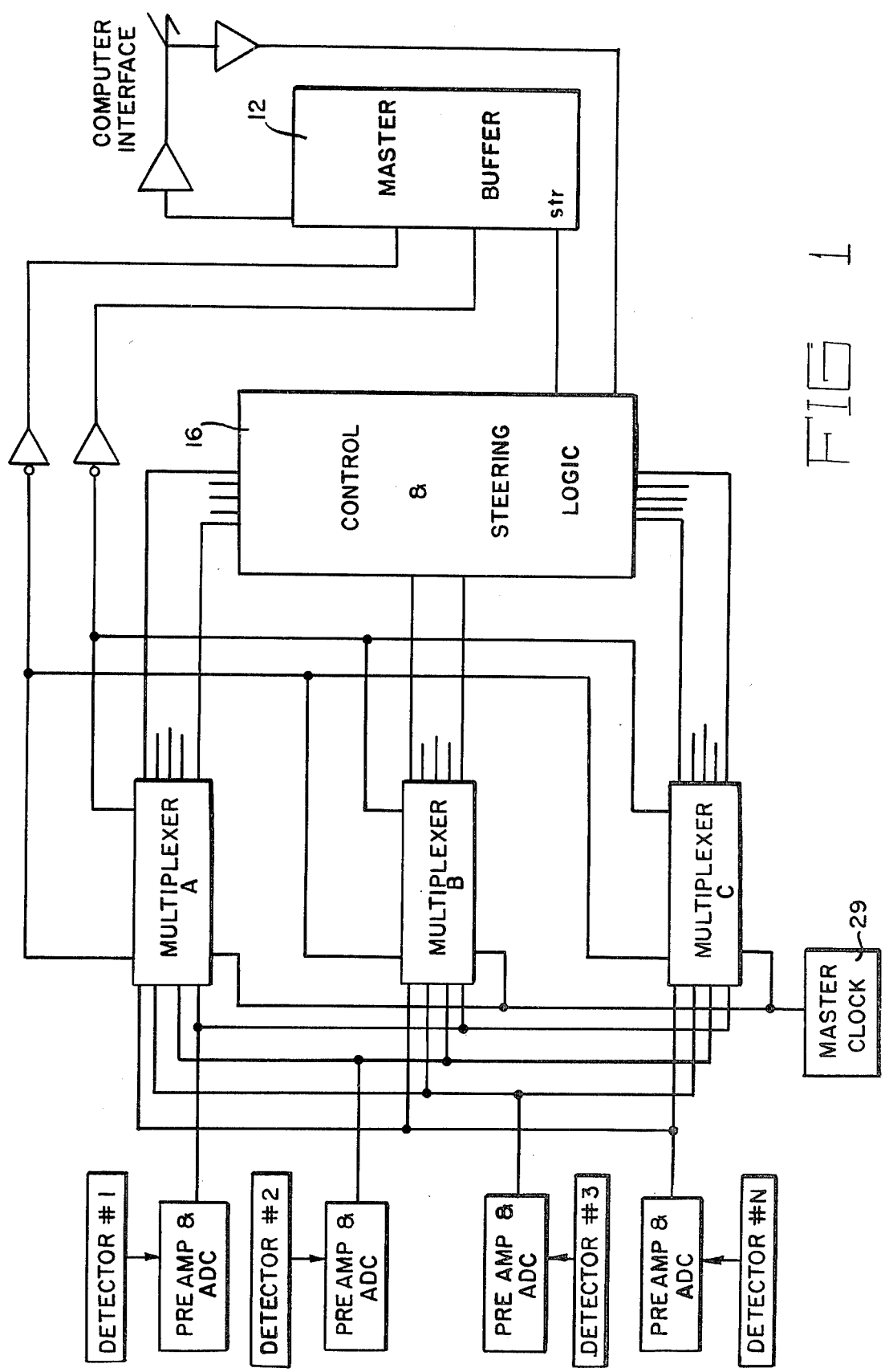

Referring to FIG. 1 there is shown the general block diagram for a multiplexing system. Such a system is designed to transfer data from a plurality of combinations of detectors 1 2 3, ... N and associated preamplifier and analog-to-digital converter (ADC) to a master buffer 12. The output of each ADC is in the form of pulses of uniform amplitude whose width is exactly proportional to an output from the associated detector. The multiplexing system transfers for storage an indication of the particular detector which is the source of a pulse and the time length of the pulse developed by the associated ADC. The system shown in FIG. 1 includes three multiplexer units that are denoted by the letters A, B, and C. The multiplexer units are controlled by a control and steering logic 16 which regulates which of the three units is on and transmitting signals and which are inhibited as will be described. Only one multiplexer unit needs to be operable at any one instant so that when a detected signal occurs that multiplexer, say Unit A, will operate. If A is engaged in transferring data to master storage 12, then multiplexer B or C will be activated by control and steering logic 16 so that simultaneous or closely simultaneous detected events may be multiplexed without loss of a detector pulse. The number of multiplexer units is a statistical determination governed by the particular experiment being conducted. Three units are shown in the particular embodiment shown in FIG. 1 but fewer or more are a matter of choice.

Figure 2:
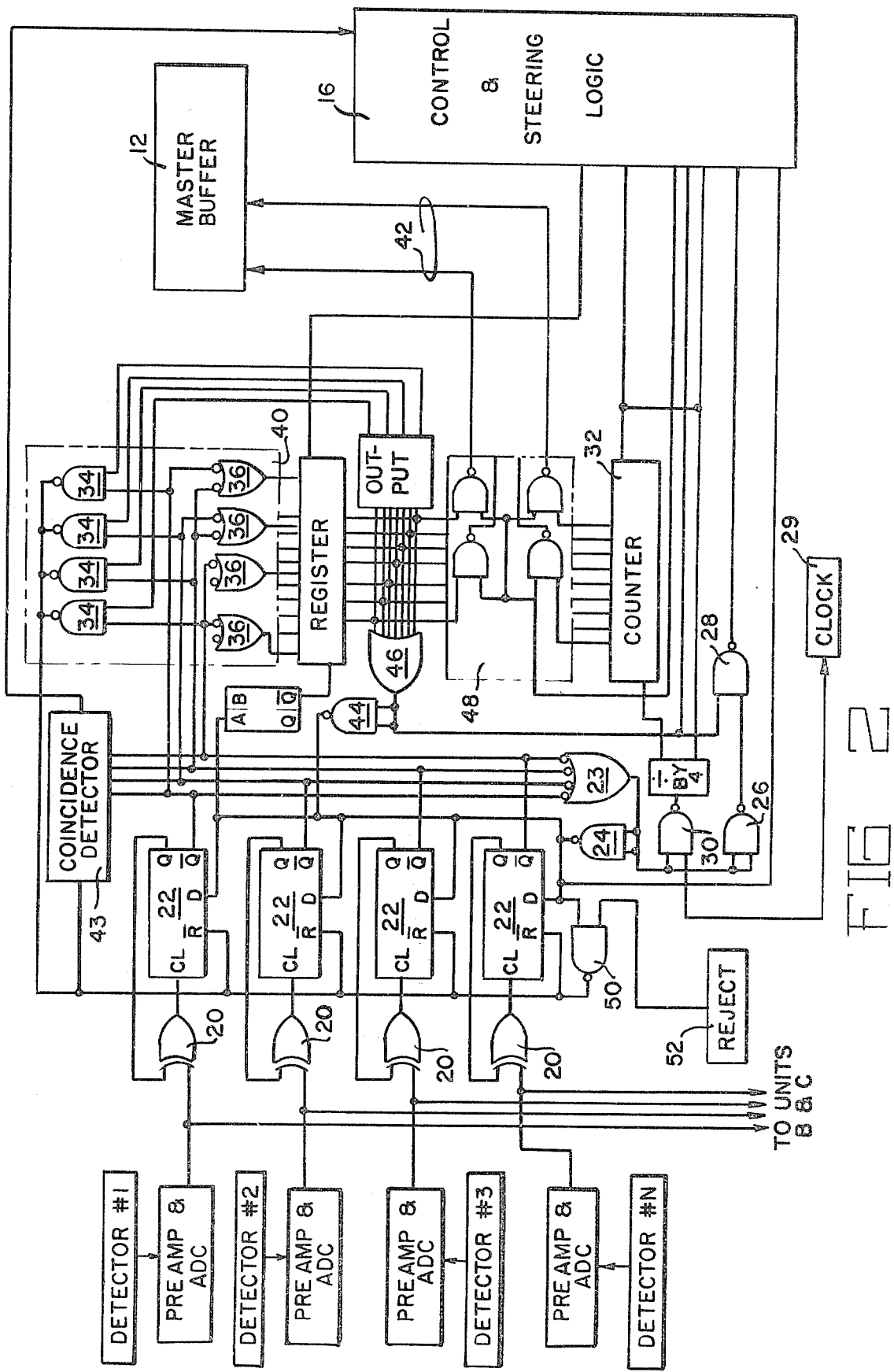

Referring specifically to FIG. 2 there is shown in detail the schematic diagram of one of the multiplexer units A, B or C and its coupling to the control and steering logic which determines which of the multiplexer units is enabled at a particular time. The output of each detector/ADC 1 2 3 ... N is coupled to an exclusive OR gate 20. The output of each exclusive OR gate is applied as the clock input CL to a D type flip-flop 22, such as SN 7474N type flip-flop. A D type flip-flop is a device which has a steady state condition such as $\overline{Q}=1$, $Q=0$ which will not change state in response to a clock pulse at CL unless the D input of the element is equal to 1. Conversely, if $\overline{Q}=0$ and $Q=1$ the device will not change state unless $D=0$. In the embodiment shown in FIG. 2 the steady state condition of each flip-flop 22 is $\overline{Q}=1$ and $Q=0$. The output $\overline{Q}$ of each flip-flop 22 is applied to nand 23 which via nand 24 applies the D input to each flip-flop 22. Therefore, in the steady state condition with $\overline{Q}=1$, D will also $=1$. The combination of nands 23 and 24 will produce $D=0$ if any of the flip-flops 22 has $\overline{Q}=0$. Therefore since the D input to each flip-flop 22 of multiplexer $A=0$ they are all disabled with the exception of the receiving flip-flop. Thus the first input pulse disables multiplexer A from receiving any other input pulses. As will be described, control and steering logic 16 will then enable another unit. The Q output of each flip-flop 22 is applied as the second input to each exclusive OR 20.

In response to a detected pulse from one of the detectors/ADC, the inputs to the particular exclusive OR 20, coupled to that detector at the leading edge of the detector pulse, will be detected pulse$=1$ and $Q=0$ so that the output of the exclusive OR 20 applied as the CL to its associated flip-flop 22 will be 1. Since the conditions for change of state, i.e. $\overline{Q}=1$, $D=1$, are met with the application of the clock pulse, the output $\overline{Q}$ will go to 0 and Q will go to 1 for only the flip-flop 22 which has received a pulse. When Q goes to 1, the inputs to the exclusive OR 20 will then be a 1 from Q and a 1 from the detector/ADC so that the output applied as the clock CL will be 0. The delay in response of Q to change its state, i.e. the propagation delay of the system, will be the time it takes for the system to go from 0 to 1 and then back to 0 again in response to the change in Q.

Figure 3:
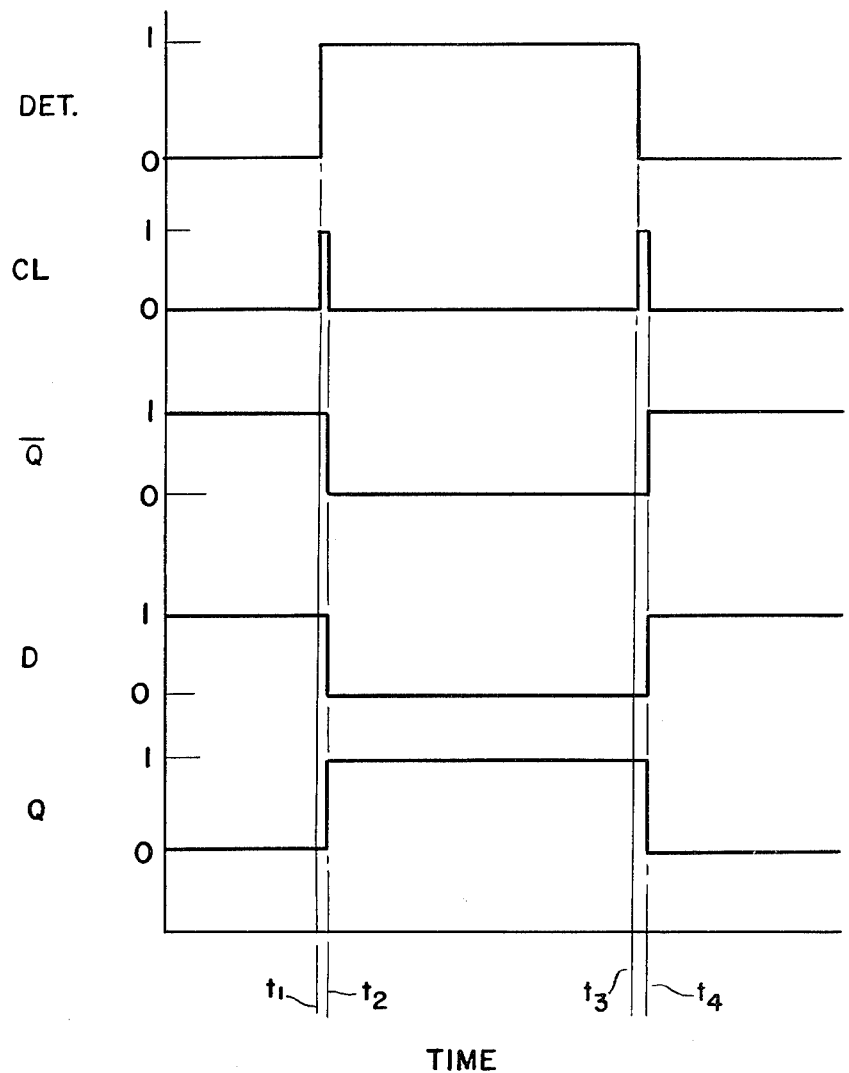

These responses are illustrated in the time diagram shown in FIG. 3. When the detector/ADC pulse goes from 0 to 1, at $t_1$, the output of exclusive OR 20, CL, goes from 0 to 1 for the length of the propagation delay of the system and then returns to 0 at $t_2$. Propagation delays, $t_2$-$t_1$, for the system as shown are on the order 25 nanoseconds. This delay in even fast experiments is always much shorter than the detected signal length. Since $\overline{Q}$ and Q have now changed state and D has changed condition in response to the change in $\overline{Q}$ the flip-flop will not change state back to the output CL=0, initial condition, until the exclusive OR once again goes to 1 since the conditions for changing state previously identified have not been met. When the detector pulse goes from 1 to 0 at $t_3$, indicating the the end of the detected pulse, the clock CL once again goes from 0 to 1 because of the coincidence of the end of the detected pulse and Q being 1. The conditions for change of state of flip-flop 22 having been achieved since D=0, Q goes to 1, $\overline{Q}$ goes to 0, and D goes to 1 at $t_4$. With D changing back to 1 all of the inputs to the flip-flop 22 are in their initial condition.

Thus, the flip-flop responds to the leading edge of the detected pulse to change the value of $\overline{Q}$ but prevents the changing back of $\overline{Q}$ until the trailing edge of the pulse appears thereby reproducing in the form of Q and D the length of the detected pulse. The control and steering logic in response to nands 26 and 28 inhibits the multiplexer A from receiving any more pulses and will enable one of the other multiplexers, B or C, so that a channel is always open to receive data. In response to the change of state of nand 23 and an input from clock 29, nand 30 changes output and counter 32 counts the pulses from clock 29 to determine the length of the detected pulse. Register 40 via nands 36 registers which of the detectors/ADC is the source of the detected pulse and stores that number.

Counter 32 ceases counting the output of master clock 29 when Q returns to 1, since the output of nand 23 will have changed. Therefore in counter 32 and register 40 will be stored the length of and source of the detected pulse. This information can be transferred to the master buffer via lines 42 when the buffer is available.

The schedule of which of the multiplexer units A, B or C is available at a particular time is determined according to design choice. The control circuitry of the control and steering logic 16 will enable another intermediate buffer while multiplexer A remains busy and thus inhibited. Thus one and only intermediate buffer A, B or C is capable of responding to the detector signal at any instance, with the possibility of all three being active at once being extremely remote. The number of intermediate buffers is statistically determined so this possibility always remains remote. A coincidence detector 43 may be utilized as protection against two simultaneous signals. Coincidence detector 43 detects if more than one flip-flop 22 changes state simultaneously and, if so, rejects both signals, by applying a signal to $\overline{R}$. Nands 34 inhibit flip-flops 22 until a signal from the control and steering has reset the register.

Nand 44 is responsive to OR 46 to disable flip-flops 22 even after Q has returned to +1 to allow the data to be transferred to the master buffer without enabling buffer A. Thus the address register and data register have developed sixteen bits which represents the number of the detector and the time span of the detector signal. This is transferred to the master buffer via gating 48. Nand 28 is responsive to the transfer of the data to develop an A ready signal which indicates to the control circuitry that buffer A is no longer busy. An anticoincidence capability once a signal has been received by flip-flop 22 is provided by nand 50 coupled to the reset inputs $\overline{R}$ of flip-flops 22. $\overline{R}$ is a master which cannot be overridden. When a reject signal precedes a detected signal, the detected signal will be prevented from being recorded by reject 52. This signal is generated by circuitry at the detector location which indicates the presence of unwanted events.

The embodiments of the invention in which an exclusive property or privilege is claimed are defined as follows:

1. A device for multiplexing data to a master storage from a plurality of pulse sources which randomly develop pulses, comprising:

a first multiplexer unit including a plurality of input circuits equal in number to the sources, each of said input circuits being coupled to a separate one of said sources and having first and second stable states indicated by different outputs therefrom and having a disabled state wherein said input circuits are prevented from switching from said one stable state to the other stable state, with all of said input circuits at said first stable state, one of said input circuits being responsive to the leading edge of a pulse of particular time duration from the source coupled thereto to assume said second stable state, disabling means coupled to said input circuits and responsive to the change in output of one of said input circuits assuming said second stable state to drive all of said input circuits to assume said disabled state, with all of said input circuits at said disabled state said input circuit at said second stable state being responsive to the trailing edge of said pulse to assume said first stable state said particular time duration after assuming said second stable state, and register means coupled to said input circuits and responsive to the output thereof to develop an output data signal indicating which of said input circuits assumes said second stable state and indicating said particular time duration, the master storage being coupled to said register means and being responsive to said output data signal to store said output signal.

2. The device of claim 1 further including at least one additional multiplexer unit to which the sources are coupled, and control and steering logic coupled to all of said multiplexer units, said logic controlling said units such that only the input circuits of one of said units are capable of responding to pulses from said sources at any one time, with one of said units receiving a pulse from one of the sources said logic enabling another of said units to receive pulses from the sources.

3. The device of claim 2 wherein each of said input circuits includes a D type flip-flop having Q and $\overline{Q}$ outputs wherein Q=1 corresponds to one of said stable states and Q=0 corresponds to the other of said stable states and said disabled state is assumed with an input being applied to the D terminal thereof.

4. The device of claim 3 wherein each of said input circuits includes an exclusive OR gate coupled to said D type flip-flop and to which said pulses from said sources are applied together with the Q output of said flip-flop, the output of said exclusive OR gate being applied as the clock input to said flip-flop, said first stable state corresponding to Q=0 and said second stable state corresponding to Q=1.

5. The device of claim 4 wherein each unit includes a first nand gate to which the $\overline{Q}$ output of each flip-flop of that unit is applied and a nand gate to which the output of the first nand gate is applied, the output of said second nand gate being applied as the D input of each of said flip-flops such that with one of said flip-flops having Q=1 all of said other flip-flops are disabled.

6. The device of claim 5 wherein each of said units includes a master clock, a third nand gate, the output of said first nand gate and said master clock being applied to said third nand gate, a counter coupled to said third nand gate for counting pulses therefrom.

7. The device of claim 6 wherein said register is coupled to said flip-flops and being responsive to one of said flip-flops assuming said second stable state to store an indication of which flip-flop assumed said second stable state.

8. The device of claim 7 wherein said logic is coupled to said register and with a unit having received a pulse from a source, said logic controls transfer to the master storage of said indication from said register and the count of said counter associated with said received pulse.

* * * * *